May 14, 1957  G. M. GRINER ET AL  2,791,907
DEVICE FOR INDICATING STAGES OF FLUID
DEPTH OF WATER IN WELLS
Filed May 19, 1954                                          2 Sheets-Sheet 2
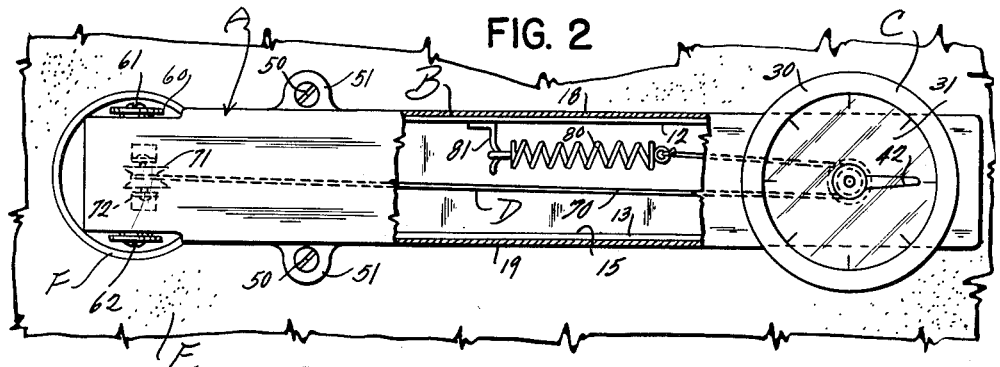
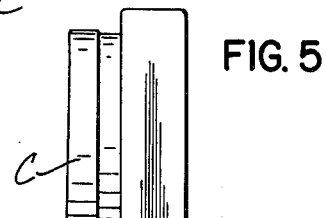
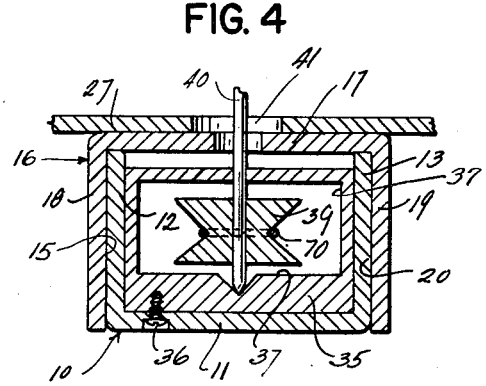
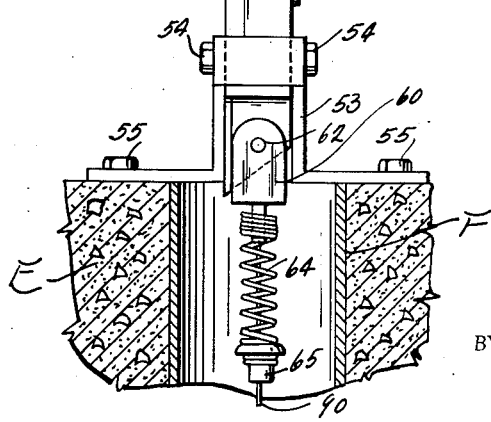
INVENTORS
Gladys M. Griner
Carl J. Crane
BY Lancaster, Allwine & Rommel
ATTORNEYS

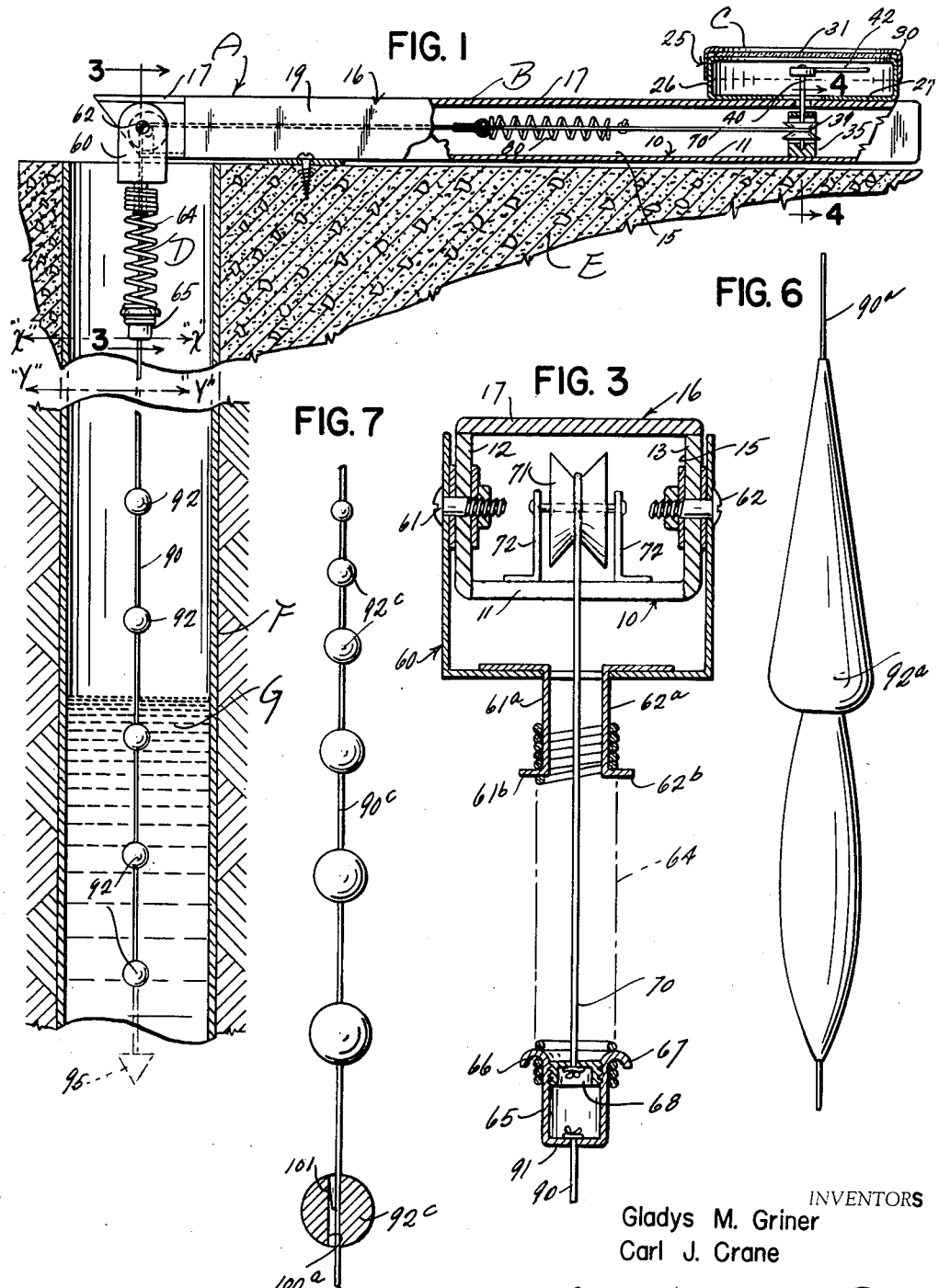

United States Patent Office 2,791,907
Patented May 14, 1957

2,791,907

DEVICE FOR INDICATING STAGES OF FLUID DEPTH OF WATER IN WELLS

Gladys M. Griner and Carl J. Crane, San Antonio, Tex.; said Crane assignor to said Griner Application May 19, 1954, Serial No. 430,766

1 Claim. (Cl. 73—309)

This invention relates to improvements in a system and means for determining depths, levels and quantity measurement of liquids in wells, tanks, containers, ponds, lakes, rivers and the like, through the use of a simple, rugged and low cost device which utilizes the principle of fluid displacement for operating an indicator.

It is known in the art relating to well depth measurement to employ a device consisting of an air pressure gage fitted to tubing and extending into the well to the depth of the standing valve. This means of measurement is expensive both insofar as cost and operation are concerned. It is also known to employ floats, having a specific gravity of less than 1.0, for indicating water levels. It is therefore a primary purpose of this invention to provide an indicator which is operable through relative movement of a unit consisting of a cable having supported thereon divers or sinkers, the total weight of that portion of the unit suspended in the well having a specific gravity greater than 1.0, whereby through fluid displacement of the sinkers, as the liquid level rises and falls, the gage will be operated through elevated and lowered movements of the cable to register the desired depth or quantity measurements.

A further object of this invention is the provision of a relatively simple and economical liquid measuring device having but few operating parts and by means of which an indicator can be effectively operated at the liquid locus or remote therefrom, through the use of a sinker string or cable having units supported thereon in varying shapes, according to the dimensional characteristics of the well, container or body of liquid being measured, for accurately determining liquid depths, levels and quantity measurements.

Other objects and advantages of the invention will be apparent during the course of the following detailed description.

In the accompanying drawings, forming a part of this specification, and wherein similar reference characters designate corresponding parts throughout the several views:

Fig. 1 is a cross sectional view taken through a well showing the improved measuring and metering device and the associated parts thereof.

Fig. 2 is a plan view, partly in section, of the device illustrated in Fig. 1.

Figs. 3 and 4 are enlarged cross sectional views taken substantially on the respective lines 3—3 and 4—4, shown in Fig. 1.

Fig. 5 is a side view of the device or appliance arranged in a different ground supporting position with respect to the well, than shown in Fig. 1.

Fig. 6 is a side elevation of one form of water displacement unit, the outlines of which may bear a proportionate size relation to the lateral dimensional area of the body of liquid being measured.

Fig. 7 is a side elevation, partly in section, showing another variation of the sinker or diver line or cable and the associated diver or sinker units, used to operate an indicator through fluid displacement in a body of liquid for ascertaining depth, level and quantity measurements.

In the drawings wherein for the purpose of illustration are shown various forms of the invention, the letter A may generally designate the improved device for indicating liquid depths and quantities. It may include a framework or casing B having an indicating instrument C associated therewith, operated by means D, part of which is intended to be extended into a body of liquid, such as oil, water, etc. for the purpose of depth or quantity determination thereof.

The framework or casing structure B preferably comprises a channel shaped housing body 10, which includes a lower wall 11 and upstanding parallel vertical walls 12 and 13 defining a chamber or channelway 15 therealong. A removable closure 16 may be provided for the casing body or base 10 including a top wall 17 and side walls 18 and 19 defining a channelway or chamber 20 wherein is received the housing body 10; the walls 12 and 13 thereof interfitting with the walls 18 and 19, as shown in Fig. 4. When the cover 16 is closed upon the body 10 the channelways provide a compartment along which a portion of the cable, comprising part of the means D extends, in operating connection with the instrument C, for the purpose of measurement indication.

The indicator C preferably comprises a cylindrical shaped box like body portion 25 having upstanding side walls 26 and a base 27. The latter may be spot welded or otherwise secured upon the top wall 17 of the frame cover 16, as shown in Figs. 1 and 4. A friction fitted inverted cup-shaped cap 30 is connected as a cover upon the body portion 25. It has a plastic dial 31 secured thereto, suitably engraved or graduated to indicate depth or quantity measurements. In the frame casing B there is provided a bracket 35, which may be detachably secured in place by screw 36, shown in Fig. 4. This bracket has a passageway 37 wherein is rotatably disposed a pulley 39 keyed to a shaft 40 which bears in the bracket. The shaft 40 extends upwardly through an opening 41 in the base wall 27 of the instrument C, and is provided with a pointer 42 for the dial 31, as shown in Fig. 1. The grooved pulley 39 is operated by a cable forming part of the means D, to be subsequently described.

The casing structure B is adapted for horizontal support upon a foundation E, such as shown in Fig. 1, and to which it may be attached by means of bolts or screws 50 extended through apertured lugs 51, as shown in Figs. 1 and 2 of the drawings. It also may be vertically positioned above the opening of a container or well, by means of a bracket structure 53, as shown in Fig. 5. This bracket structure 53 may be detachably connected at 54 to the cover and body portion of the frame or casing B. It has angled portions which may be attached as by bolts 55 to the foundation structure E.

Referring to the operating means for the indicator C, the same preferably comprises a flexible cable trained about the pulley 39 to provide for movement of the pointer 42 over the dial 31; this cable having a novel means to enable lengthwise movement, according to level quantity changes of liquid within the container. This means includes suitable liquid displacement members attached to the cable and adapted for immersion in the liquid; the total weight of the members being greater than that of the liquid displaced thereby. To that end a bracket 60, of U-shaped formation is provided, located above the top level of liquid and pivotally mounted upon screws or bolts 61 and 62 detachably secured to the side walls 12 and 13 of the body 10 of the casing structure B, as shown in Fig. 3. Such mounting enables the bracket 60 to maintain the same position with respect to the well or container whether the casing structure B is in horizontal position as shown in Fig. 1, or vertical position as shown in Fig. 5. This bracket structure 60 is preferably provided with a pair of spring supporting clips 61ª and 62ª welded in position upon bracket 60 as shown in Fig. 3 and depending through an opening in the bottom wall of the bracket 60. The clips 61ª and 62ª are provided with flanged extensions 61ᵇ and 62ᵇ adapted to be inserted through and between the convolutions of a load spring 64.

The spring 64 is a spiral tension spring and its convolutions may be threaded along the clips 61ª and 62ª to the desired extent, as shown in Fig. 3 of the drawings.

A sleeve like fitting 65, having flanged extensions 66 and 67 laterally thereon, is provided for detachable connection with the lower end of the spiral spring 64; the extensions 66 and 67 being removably extended between the convolutions of the spring 64. The fitting 65 is provided with a detachable cap 68 to which the lower well inserted end of a cable portion 70 may be connected; the said cable portion 70 being extended axially through the spring 64 and trained over a grooved pulley 71 mounted upon the wall 11 of the frame B as by brackets 72 (see Fig. 3). The peripheral edge of the bottom of the groove of the pulley lies tangential to the axis of the spring 64. The cable 70 extends from the pulley 71 longitudinally through the compartment 15 of the casing structure B and is trained around the indicator pulley 39 and thence is connected to a tension spring 80. The latter is attached at its remote end to bracket 81 which may be welded or otherwise secured to the side wall 13 of the body 10.

The indicator operating means D further includes a cable 90 connected to the bottom wall 91 of the fitting or sleeve 65 and depending downwardly into the chamber of the well or container F for immersion in the liquid G being measured for quantity or level or depth. The cable 90 has attached thereto units, members or elements 92, as shown in Fig. 1, shaped to accord with the dimensional characteristics of the body of liquid or the shape of the vessel, well or container for the liquid. The elements 92 are shown as spherical in Fig. 1. Since the well, as shown, is of the same cross sectional area throughout its water containing length the elements may be of the same displacement size.

The members 92 are preferably of greater specific gravity than the specific gravity of the liquid G to be measured, in order that they will act as divers or sinkers in the liquid, and not as floats. Since water displacement by the members 92 controls the movement of the connected cables 70 and 90, and the flexing of the load spring 64, it is a novel characteristic of this invention that the immersed assemblage within the liquid have a specific gravity which is greater than that of the liquid. This can be accomplished not only by providing the individual units 92 of material which have a greater specific gravity than that of the liquid being measured, but they could also be made of material which would float upon the liquid and the added weight could be obtained by securing a weighted member, such as shown at 95 in Fig. 1 of the drawings, some place at the bottom of the cable 90, in order that the total weight of the line assemblage will be such as to fully extend the cable 90 for complete immersion of its units 92 below the liquid level.

Preferably the units 92 have a specific gravity about twice that of the specific gravity of the liquid being measured, in order that the immersed weight thereof and dry weight thereof will be in a ratio of about 1 to 2.

The load spring 64 is an important feature of the invention because it assists in effective suspension of the weighted line so that the line or cable can move over the pulleys as an incident of dry and wet weight changes of the line and unit it supports. The limits of load spring travel may, for instance, be represented by the distance between the lines "XX" and "YY" shown in Fig. 1. Due to the presence of the load spring this degree of movement can be accurately transmitted through the pulleys, line 70 and spring 80 to the pointer 42 for correct indication of the measurement being effected. Thus, with all of the water displacement units 92 immersed the weight of the line and the sinkers or members 92 will extend the spring to a position shown by the line "XX." With all of the water displacement units 92 out of the water, so that the level of the water is below the lowermost, the spring, for instance, would be extended to the line "YY," since the dry weight of the line and the units secured thereto will be greater than the wetted weight. We have found that under practical working conditions, such as to overcome friction of the units 92 with the well sides, casing, etc., the dry weight of the line and its elements 92 secured thereto should be approximately twice that of the immersed weight. Movement of the cable about the pulley 39 is rendered accurate because of the slight tension of the spring 80, which is adjusted to maintain the indicator cord or cable or thread 70 in non-slipping contact with the said pulley at all times.

The load spring 64, the liquid displacement units 92, and the dial calibration are variables which are selective for any depth of well or body of water. Thus, a three sphere weighted line could be made to indicate empty, half-full and full, whereas a cable line in the body of liquid could have 100 water displacement spheres or units, to indicate in a 100 foot long well element, increments of 1 foot water level changes.

The cap 30 has its dial 35 securely cemented thereto. The cap is rotatable in either direction for ease of zero-setting with respect to pointer 42.

It is possible to use combination metal and light-weight material for the water displacement divers. It is even possible to use a light weight metal rod or bar having a specific gravity greater than that of the liquid being measured. The immersed weight of the sinker or diver element will depend upon the depth of the fluid, which in turn is used to report the fluid depth in the well.

It is possible to establish remote signalling of the measurements to be taken, through electrical or other types of signalling apparatus, and any number of the divers or sinkers can be used.

It is the purpose of this invention to measure quantities as well as depths of liquid. Therefore since the horizontal cross-sectional area of a chamber of a container may vary at different levels the shape of the diver or weight can vary. For instance, Fig. 6 at 92ª is shown an elongated weight upon the line or cable 90ª, the shape characteristics of which conform substantially to the lateral dimensional area of the liquid container at its various heights.

From the foregoing it can be seen that the invention broadly relates to a system of liquid displacement elements which are linked or chained together for the purpose of individually or collectively displacing an amount of liquid lighter in weight than that of the elements which do the displacing. It is the difference in the immersed wet and dry weights of the well immersed portion of the means D that serves to produce the slight cable movement for operation of the indicator. The details of this invention are very simple, rugged, and low in cost, and free from basic causes of malfunctioning, such as leaks in hydrostatic devices, or insulation problems in electrical devices, or puncturing of floating devices.

It is possible in the line 90ᶜ, shown in Fig. 7, which corresponds to line 90 of Fig. 1, that the water displacing units 92ᶜ may be of varying sizes along the line to conform to the lateral dimensional areas of the body of liquid at different horizontal levels, the measurement of which is to be taken. As shown, units 92ᶜ may each consist of a body having a passageway 100ª therethrough and held in a desired position along the line 90ᶜ by a wedge 101. By removing the wedge 101 the positions of the sinkers or units 92ᶜ may be varied along the lines.

The lines 70 and 90 may be of stainless steel, bronze or other non-corrosive wire, or of nylon or monofilament or other nylon cordage. The members 92 may be of magnesium, aluminium alloy, plastic or of most any suitable material. It is not desired to be restricted to any particular ratio of specific gravities of the liquid to be displaced and the immersion usable portion of cable 90 and its units 92. The ratio of 1 to 2 has been found acceptable. By way of example, if the measurement is to be taken of water within a well the immersed wetted load weight of the unit portion to be immersed in a well could be from 8 to 10 ounces and the dry weight thereof would be from 16 to 20 ounces.

Various changes in the shape, size and arrangement of parts may be made to the form of invention herein shown and described, without departing from the spirit of the invention or scope of the claim.

What is claimed is:

In a device for measuring liquids for depth, level and quantity the combination of an elongated casing having at one end thereof an indicator provided with a movable indicating element, a bracket pivoted at the opposite end of the casing, a pulley rotatably mounted upon said bracket having a cable trained thereover with an operating connection with the indicating element of the indicator, said cable including a vertical portion depending from said pulley, having at various distances therealong liquid displacement units the overall total weight of which is greater than the liquid displaced by said units, and a tension load supporting spring connected with said bracket and said cable at a position upon the cable above the liquid displacement units for lifting and lowering the vertical portion of the cable as the wet and dry weights thereof varies.

References Cited in the file of this patent

UNITED STATES PATENTS

| | | |
|---|---|---|
| 706,505 | Washington | Aug. 5, 1902 |
| 1,723,173 | Huggins | Aug. 6, 1929 |
| 1,859,933 | Nikonow | May 24, 1932 |
| 2,029,405 | Beadle | Feb. 4, 1936 |
| 2,069,959 | Kuljian | Feb. 9, 1937 |
| 2,096,411 | St. John | Oct. 19, 1937 |
| 2,653,478 | Harper | Sept. 29, 1953 |